United States Patent
Zheng et al.

(10) Patent No.: US 9,578,676 B2
(45) Date of Patent: Feb. 21, 2017

(54) SYSTEMS AND METHODS FOR REDUCING IN-DEVICE COEXISTENCE (IDC) INTERFERENCE

(71) Applicant: Marvell World Trade Ltd., St. Michael (BB)

(72) Inventors: Hong Zheng, Shanghai (CN); Xuan Zhou, Fremont, CA (US); Lei Zhang, San Jose, CA (US); Xinhua Ma, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 234 days.

(21) Appl. No.: 14/469,189

(22) Filed: Aug. 26, 2014

(65) Prior Publication Data

US 2015/0063178 A1    Mar. 5, 2015

Related U.S. Application Data

(60) Provisional application No. 61/870,505, filed on Aug. 27, 2013.

(51) Int. Cl.
| | |
|---|---|
| *H04J 1/00* | (2006.01) |
| *H04W 76/04* | (2009.01) |
| *H04B 1/403* | (2015.01) |
| *H04W 16/14* | (2009.01) |
| *H04W 76/02* | (2009.01) |
| *H04L 5/00* | (2006.01) |
| *H04L 5/14* | (2006.01) |

(52) U.S. Cl.
CPC .......... *H04W 76/048* (2013.01); *H04B 1/406* (2013.01); *H04L 5/0062* (2013.01); *H04L 5/1469* (2013.01); *H04W 16/14* (2013.01); *H04W 76/026* (2013.01)

(58) Field of Classification Search
CPC ....................................................... H04B 1/56
USPC ....................................................... 370/280
See application file for complete search history.

(56) References Cited

U.S. PATENT DOCUMENTS

| | | | |
|---|---|---|---|
| 2006/0030265 A1* | 2/2006 | Desai ................ | H04W 72/1215 455/41.2 |
| 2010/0197235 A1* | 8/2010 | Wilhelmsson ...... | H04W 52/243 455/63.3 |
| 2011/0312288 A1* | 12/2011 | Fu ......................... | H04B 1/406 455/88 |
| 2013/0303214 A1* | 11/2013 | Ahmadi ............. | H04W 72/1215 455/501 |
| 2014/0126552 A1* | 5/2014 | Dayal ................... | H04W 88/06 370/336 |

* cited by examiner

*Primary Examiner* — Samina Choudhry

(57) ABSTRACT

Systems and methods are provided for avoiding in-device coexistence interference on a user equipment. A first wireless communication circuitry and a second wireless communication circuitry operate concurrently on the user equipment. The second wireless communication circuitry detects an operational status of the first wireless communication circuitry, and determines if the operational status is transmission or reception. In response to determining that the operational status is transmission, the second wireless communication circuitry avoids receiving data. In response to determining that the operational status is reception, the second wireless communication circuitry avoids transmitting data.

16 Claims, 4 Drawing Sheets

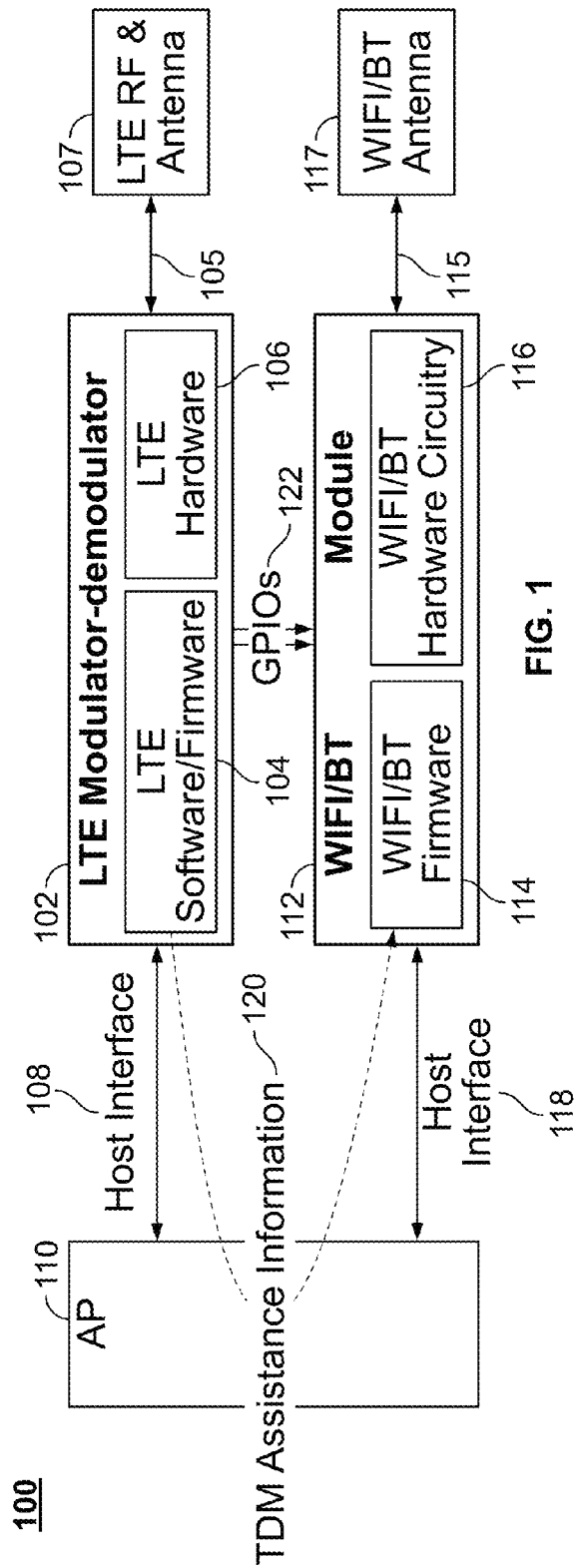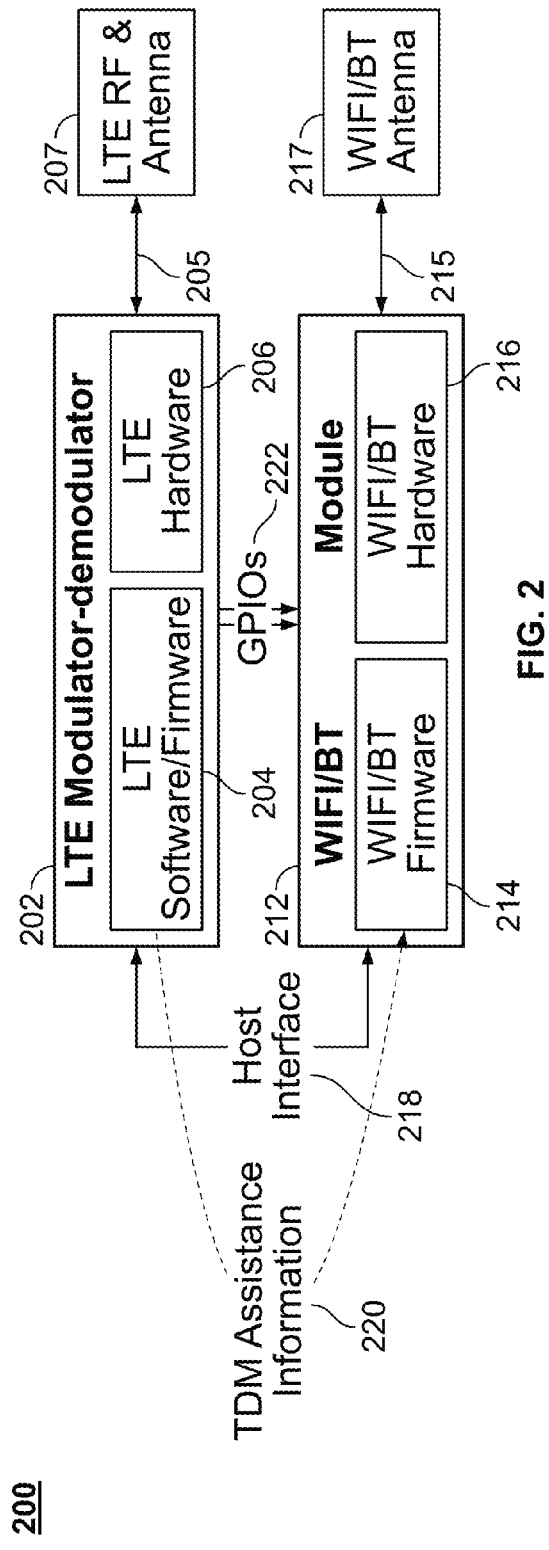

SYSTEMS AND METHODS FOR REDUCING IN-DEVICE COEXISTENCE (IDC) INTERFERENCE

CROSS REFERENCE TO RELATED APPLICATIONS

This application claims the benefit under 35 U.S.C. §119(e) of U.S. Provisional Application No. 61/870,505, filed on Aug. 27, 2013, which is hereby incorporated by reference herein in its entirety.

FIELD OF USE

This disclosure is generally directed to In-device Coexistence (IDC) interference, and more particularly to reducing IDC interference by monitoring signals on general-purpose input/output (GPIO) pins.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Electronic communication equipment today usually contains two or more radio transceivers that can operate concurrently. A long-term evolution (LTE) smart phone or an LTE mobile hotspot can be equipped with an LTE radio, a wireless fidelity (WIFI) radio, a Bluetooth (BT) radio, and a global navigation satellite system (GNSS) radio, all in the same device. When the LTE working frequency is close to the WIFI/BT frequency on the same LTE smart phone, for instance, IDC interference may occur. More specifically, LTE radio transceivers can operate under Band 40 (2300 MHz-2400 MHz) and Band 7 (2500 MHz-2570 MHz). These two LTE bands are adjacent to the industrial, scientific and medical (ISM) band (2400 MHz-2500 MHz) under which the WIFI/BT radio transceivers typically operate. As a result, the LTE radio transceivers and the WIFI/BT radio transceivers on the same device may cause serious IDC interference for each other.

Traditionally, IDC interference is mitigated by radio frequency (RF) techniques, such as filtering or isolation. However, analyses made by the Third Generation Partnership Project (3GPP) showed that current state-of-the-art RF filtering technology cannot provide sufficient interference rejection for certain IDC scenarios. There have also been attempts to address the IDC interference problem by time-division multiplexing (TDM) techniques, such as the Wireless Coexistence Interface (WCI) proposed by the Bluetooth standard group. However, the transmission and signaling protocols defined by WCI is complicated, often requiring complete hardware and software redesign of existing radios. The research and development cost for implementing such a system can be extremely high.

SUMMARY

In view of the foregoing, systems and methods are provided for switching among operating modes on a smart platform.

According to one aspect of the disclosure, a user equipment may experience in-device coexistence interference between a first wireless communication circuitry and a second wireless communication circuitry on the user equipment. An operational status of the first wireless communication circuitry is detected and determined to be either transmission, reception, or OFF. If the operational status of the first wireless communication circuitry is determined to be transmission, the second wireless communication circuitry will avoid receiving data. If the operational status of the first wireless communication circuitry is determined to be reception, the second wireless communication circuitry will avoid transmitting data. In some embodiments, if the operational status of the first wireless communication circuitry is determined to be OFF, the second wireless communication circuitry can transmit and receive data freely.

In some embodiments, the operational status of the first wireless communication circuitry is detected by receiving and analyzing, at the second wireless communication circuitry, a time-division multiplexing (TDM) assistance information and general-purpose input/output (GPIO) signals from the first wireless communication circuitry. The TDM assistance information may include long-term evaluation (LTE) configuration, discontinuous reception (DRX) mode information, and system frame number (SFN). The GPIO signals may be received from at least one GPIO pin.

In some embodiments, the TDM assistance information is analyzed by determining whether the first wireless communication circuitry has enabled a DRX mode, is under a DRX on-duration, is under a time-division duplex (TDD) mode, or is under a TDD transmitting time slot. The TDM assistance information may be further analyzed by determining whether the LTE configuration is frequency-division duplex (FDD) or time-division duplex (TDD). In response to determining that the LTE configuration is FDD, the operational status of the first wireless communication is set to reception. In response to determining that the LTE configuration is TDD, the uplink/downlink (UL/DL) configurations of the TDD are analyzed to set the operational status of the first wireless communication accordingly. For instance, if the TDD is operating in UL communication, the operational status is set to transmission; if the TDD is operating in DL communication, the operational status is set to reception.

In some embodiments, the operational status of the first wireless communication circuitry is detected by monitoring GPIO_drx signal.

In some embodiments, the second wireless communication circuitry avoids transmitting data by transmitting tasks based on task priority.

In some embodiments, the first wireless communication circuitry is an LTE modulator-demodulator and the second wireless communication circuitry is one of a wireless fidelity (WIFI) module, a Bluetooth (BT) module, or a global navigation satellite system (GNSS) module.

BRIEF DESCRIPTION OF THE DRAWINGS

Further features of the disclosure, its nature and various advantages will be apparent upon consideration of the following detailed description, taken in conjunction with the accompanying drawings, in which:

FIG. 1 shows a schematic diagram of an LTE and WIFI/BT co-existing equipment with an application server in accordance with an embodiment of the present disclosure;

FIG. 2 shows a schematic diagram of an LTE and WIFI/BT co-existing equipment without an application server in accordance with another embodiment of the present disclosure;

DETAILED DESCRIPTION

Figure 3:
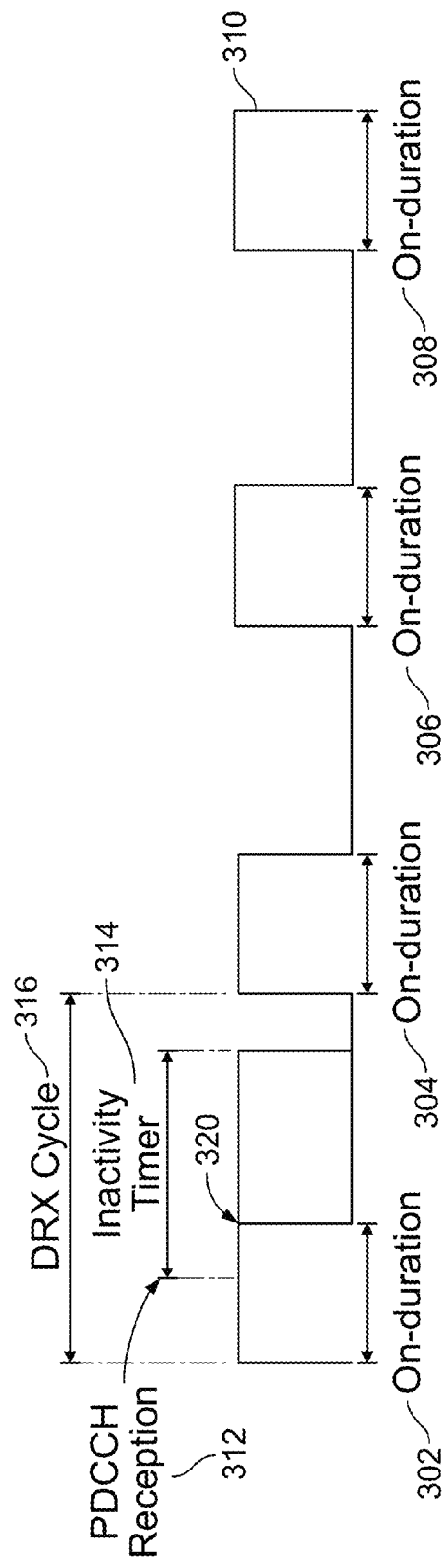
FIG. 3 shows a level diagram of a discontinuous reception (DRX) mode of user equipment in accordance with an embodiment of the present disclosure.

To provide an overall understanding of the disclosure, certain illustrative embodiments will now be described in connection with systems and methods for controlling operating modes of smart platforms. However, the systems and methods described herein may be adapted and modified as is appropriate for the application being addressed and that the systems and methods described herein may be employed in other suitable applications, and that such other additions and modifications will not depart from the scope thereof.

FIG. 1 illustrates a schematic diagram of an LTE and WIFI/BT co-existing equipment with an application processor in accordance with an embodiment of the present disclosure. This system architecture is usually applicable to smart phones, smart tablets, or customer premise equipment (CPE), which will be collectively referred to as "user equipment" herein in relation to FIG. 1. Both LTE modulator-demodulator (Modem) 102 and WIFI/BT module 112 reside on user equipment 100. In some embodiments, LTE Modem 102 and WIFI/BT module 112 are wireless communication circuitry of a user equipment. LTE Modem 102 and WIFI/BT module 112 are connected to application processor (AP) 110 via host interfaces 108 and 118, respectively. Host interface 108 may be an internal memory hardware input/output interface, a universal serial bus (USB) input/output interface, or any other interface suitable for non-real-time data communication. Host interface 118 may preferably be a secure digital input/output (SDIO) interface or any other interface suitable for non-real-time data communication.

LTE Modem 102 may employ one or more LTE hardware circuitry 106, on which LTE software/firmware 104 may operate. WIFI/BT module 112 may employ one or more WIFI/BT hardware circuitry 116, on which WIFI/BT firmware 114 may operate. In some embodiments, LTE hardware circuitry 106 and WIFI/BT hardware circuitry 116 may be implemented as an application specific integrated circuit (ASIC), a field programmable gate array (FPGA), or a system-on-chip (SoC), which may include one or more microprocessors, memory blocks, and other suitable blocks. LTE Modem 102 is connected with LTE RF and antenna 107 via bus 105, and WIFI/BT module 112 is connected with WIFI/BT antenna 117 via bus 115. In some embodiments, LTE RF and antenna 107 and WIFI/BT module 112 are physically located in proximity of each other on user equipment 100. LTE Modem 102 and WIFI/BT module 112 are additionally connected with each other via at least one GPIO pin 122. Real-time signals may be transmitted from LTE Modem 102 to WIFI/BT module 112 via the at least one GPIO pin 122.

LTE Modem 102 may send semi-static TDM assistance information 120 to WIFI/BT module 112 via AP 110. TDM assistance information 120 may have a low requirement for processing time and does not have a hard deadline for the reception thereof (i.e., TDM assistance information is non-real-time data). In some embodiment, TDM assistance information 120 may include LTE configuration information, such as whether the LTE Modem is currently configured as frequency-division duplex (FDD) or time-division duplex (TDD). If the LTE Modem is currently configured as TDD, the TDM assistance information may additionally include uplink/downlink (UL/DL) configuration information of the LTE TDD. There are seven different UL/DL configurations for LTE TDD, as shown below in Table 1.

TABLE 1

TDD UL/DL configuration of LTE

| UL/DL Configuration | DL-to-UL Switch Point Periodicity | Subframe Number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, an UL or DL frame of each UL/DL configuration contains ten subframes. The subframes can be switched periodically, either every 5 ms or every 10 ms, as illustrated by the DL-to-UL switch point periodicity column. The "D" subframe refers to a downlink subframe; the "U" subframe refers to an uplink subframe; and the "S" subframe refers to a special subframe. In some embodiments, WIFI/BT module 112 can determine from one of the seven UL/DL configurations the exact uplink/downlink subframe at any particular time. In particular, WIFI/BT module 112 can accurately predict during which time slot is LTE Modem 102 transmitting data (i.e., transmitting an uplink subframe), and during which time slot is LTE Modem 102 receiving data (i.e., receiving a downlink subframe) by looking up the subframe number embedded in the UL/DL configuration information. The transmission, reception, ON and OFF states of LTE Modem 102 may collectively be referred to herein as an operational status of LTE Modem 102.

TDM assistance information 120 may also include discontinuous reception (DRX) mode information of LTE Modem 102. The DRX mode information may include one or more of drxStartOffset, DRX cycle (shortDRX-Cycle and/or longDRX-Cycle), DRX on-duration timer, and DRX inactivity timer. The DRX mode of LTE Modem 102 helps reduce power consumption by allowing it to power down for a pre-determined time period. Details of the operation of LTE Modem 102 under DRX mode will be illustrated in relation to FIG. 3.

TDM assistance information 120 may additionally include system frame number (SFN) data. The SFN helps with synchronization of frames received at LTE Modem 102 by acting as a timing reference. In the present disclosure, the SFN is saved when a first GPIO frame is triggered, and this information (SFN_Start) may be used along with GPIO signals to calculate theoretical DRX on-duration, as will be explained below in relation to FIG. 4.

LTE Modem 102 sends the GPIO signals in real time, via the at least one GPIO pin 122, to WIFI/BT module 112. The GPIO signals include two types of information: (1) GPIO frame, and (2) GPIO_DRX. The GPIO frame works in interrupt mode, whereby a pulse is generated at every LTE radio frame boundary. The SFN of the first GPIO frame received by WIFI/BT module 112 is labeled as SFN_Start. The SFN of subsequent GPIO frames received are gradually incremented by the firmware running on WIFI/BT module 112, such as WIFI/BT firmware 114. In this way, the SFN of each GPIO frame received are maintained by WIFI/BT module 112. In addition, each LTE radio frame contains ten subframes, each of which is 1 ms in duration. In a preferred embodiment, WIFI/BT firmware 114 may also internally maintain an LTE subframe count within each GPIO frame received. The GPIO_DRX indicates actual ON/OFF DRX state of LTE Modem 102, with "1" indicating ON and "0" indicating OFF. WIFI/BT firmware 114 queries GPIO_drx periodically to obtain actual DRX state of LTE Modem 102, as will be elaborated on in relation to FIG. 4 below.

FIG. 2 illustrates a schematic diagram of an LTE and WIFI/BT co-existing equipment without an application processor in accordance with an embodiment of the present disclosure. This system architecture is usually applicable to low-cost mobile WIFI hotspot devices, such as MIFI®, which will be collectively referred to as "user equipment" herein in relation to FIG. 2. An application processor (AP) is not available in user equipment 200. As such, LTE Modem 202 communicates TDM assistance information 220 via host interface 208, rather than through an AP as is the case in the system architecture in FIG. 1. Host interface 208 may preferably be an SDIO interface or any other interface suitable for non-real-time data communication. Similar to FIG. 1, real-time signals are transmitted via at least one GPIO pin 222 between LTE Modem 202 and WIFI/BT module 212. Other components, hardware, firmware or software work in substantially the same manner as their counterpart do in FIG. 1 and hence are not repeated here for the sake of simplicity.

FIG. 3 illustrates a level diagram of a DRX mode of user equipment in accordance with an embodiment of the present disclosure. As previously discussed in relation to FIG. 1, the DRX mode of LTE Modem 102 helps reduce power consumption by allowing it to power down for a pre-determined time period. The DRX mode discussed herein refers to DRX in connected mode as specified in 3GPP Technical Specification 36.211 Section 5.7. DRX on-durations 302, 304, 306, and 308 each refers to the duration in downlink subframes that LTE Modem 102 waits for to receive data from physical downlink control channel (PDCCH) when LTE Modem 102 is in DRX mode. DRX cycle 316 specifies the periodic repetition of an on-duration followed by a possible period of inactivity, the latter indicating the pre-determined time period during which LTE Modem 102 powers down.

When a DRX cycle starts, the SFN of the current frame is assigned to drxStartOffset. When data is received from PDCCH (i.e., PDCCH reception 312), LTE Modem 102 starts inactivity timer 314, during which it waits to successfully decode the data received on PDCCH. If decoding is not successfully before inactivity timer 312 expires, LTE Modem 102 temporarily powers down until the onset of the next DRX cycle (i.e., on-duration 304). If, however, decoding is successful before inactivity timer 312 expires, LTE Modem 102 may continue to receive or transmit data even after on-duration 302 has ended (e.g., at 320). In this way, the actual ON time of LTE Modem 102 extends beyond on-duration 302, and additional information, such as GPIO signals (e.g., GPIO_DRX), will have to be relied on to capture the actual ON time of LTE Modem 102, as will be illustrated in FIGS. 4 and 5 below.

Figure 4:
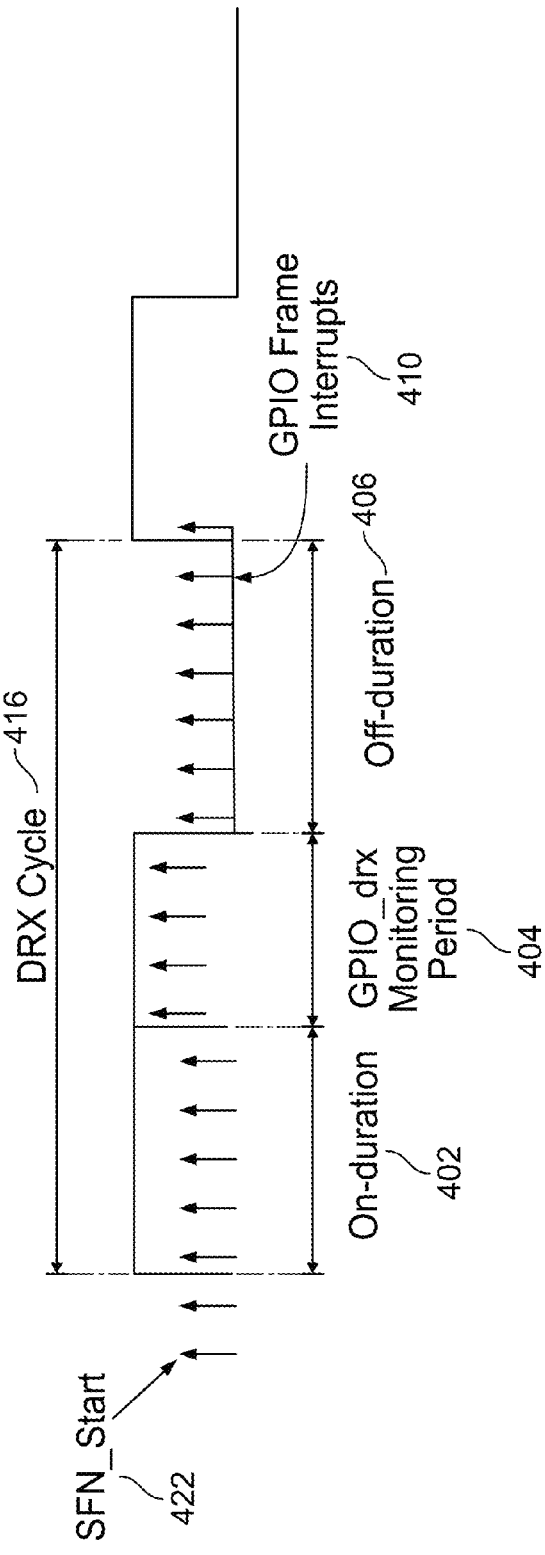
FIG. 4 shows a level diagram of GPIO signals in accordance with an embodiment of the present disclosure.

FIG. 4 illustrates a level diagram of GPIO signals in accordance with an embodiment of the present disclosure.

SFN_Start 422 indicates the SFN saved when a first GPIO frame is triggered. As explained above, the GPIO frames are triggered at every LTE frame boundary and incremented by one at each GPIO frame interrupt (e.g., GPIO frame interrupts 410).

The purpose of maintaining the above-mentioned TDM assistance information 120 and GPIO signals is so that they can be used to calculate a theoretical DRX on-duration (e.g., DRX on-duration 302, 402), and hence a theoretical DRX pattern, such as DRX pattern 310. This calculation is defined by 3GPP Technical Specification 36.321. In the case of a short DRX cycle, the short DRX cycle theoretically starts when the following relationship holds:

$$[(SFN*10)+\text{subframe number}]\bmod(\text{short}DRX\text{-}Cycle) = (drx\text{StartOffset})\bmod(\text{short}DRX\text{-}Cycle) \quad (1)$$

In the case of a long DRX cycle, the long DRX cycle theoretically starts when the following relationship holds:

$$[(SFN*10)+\text{subframe number}]\bmod(\text{long}DRX\text{-}Cycle) = (drx\text{StartOffset}) \quad (2)$$

As explained above in relation to FIG. 3, the data received from PDCCH may be successfully decoded before an inactivity timer expires. In this scenario, LTE Modem 102 continues to receive PDCCH data after on-duration 402. The actual ON/OFF DRX state of LTE Modem 102 is captured by monitoring GPIO_drx during GPIO_drx monitoring period 404. The GPIO_drx is set to either 0 or 1 depending on the actual ON/OFF DRX state of LTE Modem 102. Setting GPIO_drx to 1 indicates that the actual DRX state is ON, and setting GPIO_drx to 0 indicates that the actual DRX state is OFF. WIFI/BT firmware 114 monitors the value of GPIO_drx during the GPIO_drx monitoring period 404, but it is not necessary for WIFI/BT firmware 114 to monitor GPIO_drx at all time. This is because the theoretical DRX state of LTE Modem 102 can be deduced from TDM assistance information 120 outside of GPIO_drx monitoring period 404. For instance, during DRX on-duration 402, LTE Modem 102 will at least work in the reception mode, hence the value of GPIO_drx will definitely be set to 1. On the other hand, after LTE Modem 102 enters OFF state (i.e., after GPIO_drx has been set to 0 during a given DRX cycle), it will remain OFF until the next DRX cycle.

In this way, the theoretical DRX pattern calculated from SFN provides an assisted estimate of the ON/OFF DRX state of LTE Modem 102. Meanwhile, accurate ON/OFF DRX state can also be finely indicated by the GPIO_drx signal, if necessary. By combining these two approaches, WIFI/BT firmware 114 can predict ON/OFF state of LTE Modem 102 to adjust its scheduling needs in a flexible manner. Furthermore, LTE Modems and WIFI/BT modules typically reserve a few GPIO pins for function extension and debugging purposes. By utilizing these existing hardware, there is no need for extensive hardware upgrades in order to implement the systems and methods described in the present disclosure in order to reduce IDC interference problems.

Figure 5:
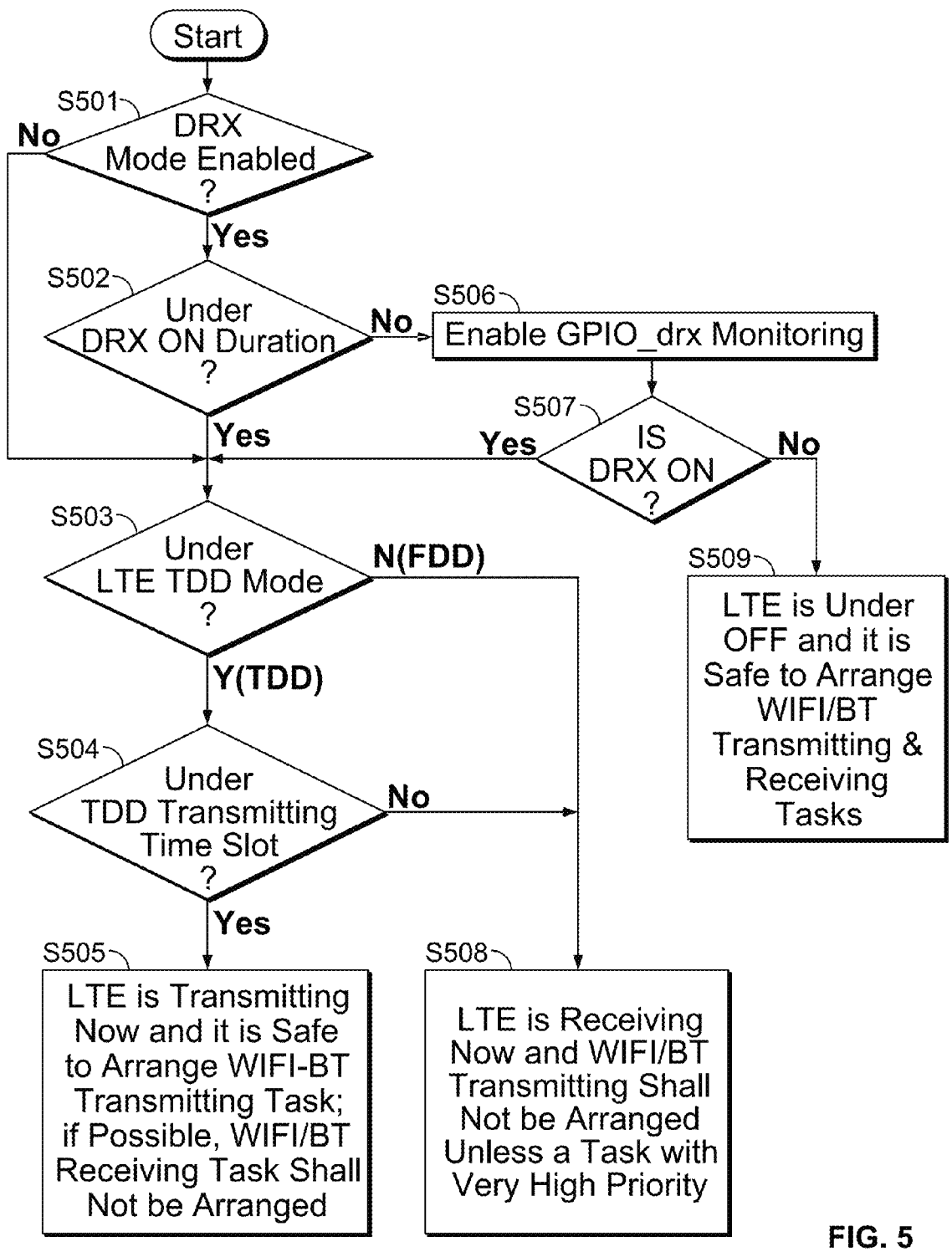
FIG. 5 shows a flow diagram of a method to dispatch tasks at a WIFI/BT transceiver in accordance with an embodiment of the present disclosure.

FIG. 5 illustrates a flow diagram of a method to dispatch tasks at a WIFI/BT transceiver in accordance with an embodiment of the present disclosure. At S501, LTE Modem 102 provides TDM assistance information 120, which indicates if LTE Modem 102 has enabled DRX mode. If DRX mode has been enabled, TDM assistance information 120 and GPIO frame information can be used to calculate if LTE Modem 102 is under DRX on-duration. Details of the calculations involved have been discussed above in relation to FIG. 4. If LTE Modem 102 has enabled DRX mode and is under DRX on-duration, or if it has not enabled DRX mode at all, TDM assistance information provides further details indicating whether LTE Modem 102 is operating under TDD mode or FDD mode, at S503. If it is operating under the FDD mode, WIFI/BT firmware 114 can determine that LTE Modem 102 is receiving data (i.e., the operational status of LTE Modem 102 is reception), as shown in S508. As such, WIFI/BT firmware 114 will regulate the operation of WIFI/BT module 112 such that transmission of tasks will be avoided unless a task with very high priority is scheduled to transmit. If LTE Modem 102 is operating under TDD mode, TDM assistance information provides further information regarding the UL/DL configurations of its TDD mode. Details of UL/DL configurations have been illustrated in Table 1 in relation to FIG. 1 above.

Based on the UL/DL configurations, at S504, WIFI/BT firmware 114 determines if LTE Modem 102 is operating under TDD transmitting time slot (i.e., transmitting an uplink subframe). If LTE Modem 102 is operating under TDD transmitting time slot, WIFI/BT firmware 114 can determine that LTE Modem 102 is transmitting data (i.e., the operational status of LTE Modem 102 is transmission), as shown in S508. As such, it is safe for WIFI/BT firmware to arrange data to be transmitted from WIFI/BT module. At the same time, WIFI/BT module should avoid receiving data. However, if LTE Modem 102 is not operating under TDD transmitting time slot (i.e., receiving a special subframe or a downlink subframe), the WIFI/BT firmware 114 can also determine, at S508, that LTE Modem 102 is receiving. Thus, WIFI/BT module should avoid transmitting data unless a task with very high priority is scheduled for transmission.

Going back to S502, if LTE Modem 102 has enabled DRX mode but is not under DRX on-duration, data may still be received or transmitted under certain scenarios as outlined in relation to FIGS. 3 and 4. In this case, WIFI/BT firmware 114 enables GPIO_drx monitoring at S506 to periodically query the GPIO_drx signal. At S507, WIFI/BT firmware 114 determines, from the GPIO_drx signal obtained, whether the DRX state of LTE Modem 102 is indeed ON. If so, WIFI/BT module proceeds to S503 and carries out the method as discussed above. If the DRX state is OFF, WIFI/BT firmware 114 determines that LTE Modem 102 is under OFF (i.e., the operational status is OFF) at S509, and it is safe to arrange WIFI/BT module to transmit and/or receive tasks at will, until the next DRX cycle begins, if applicable.

Figure 6:
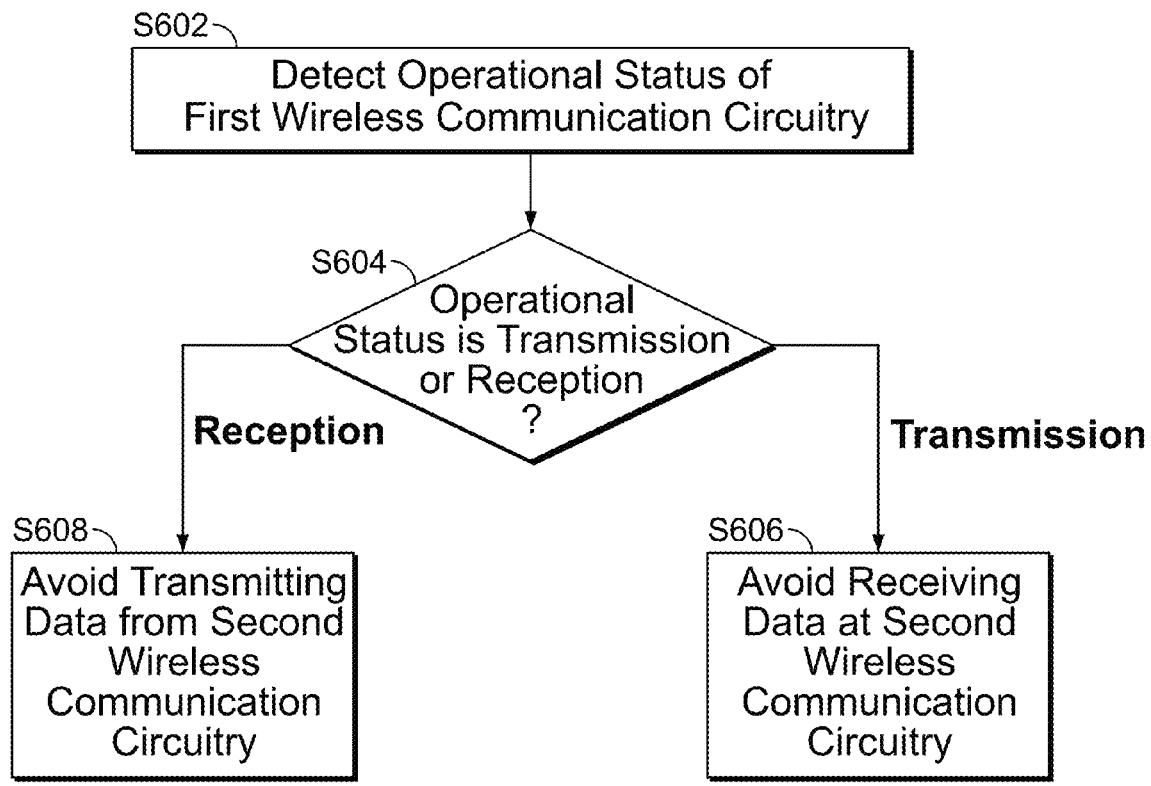
FIG. 6 shows a flow diagram of a method to reduce IDC interference in two wireless communication circuitry in accordance with an embodiment of the present disclosure.

FIG. 6 illustrates a flow diagram of a method to reduce IDC interference in two wireless communication circuitry on user equipment, in accordance with an embodiment of the present disclosure. At S602, an operational status of a first wireless communication circuitry of user equipment is detected at a second wireless communication circuitry. At S604, the second wireless communication circuitry determines whether the operational status is transmission or reception. At S606, in response to determining that the operational status is transmission, avoiding receiving data at the second wireless communication circuitry. At S608, in response to determining that the operational status is reception, avoid transmitting data from the second wireless communication circuitry.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method for avoiding in-device coexistence interference on a user equipment having a first wireless communication circuitry and a second wireless communication circuitry, the method comprising:
   receiving, via a general-purpose input/output (GPIO) pin at the second wireless communication circuitry of the user equipment, GPIO signal including time-division multiplexing (TDM) assistance information having information relating to a status of operation and a configuration of wireless communication of the first wireless communication circuitry;
   predicting, at the second wireless communication circuitry of the user equipment, an operational status of the first wireless communication circuitry of the user equipment based on the GPIO signal, wherein predicting the operational status of the first wireless communication circuitry comprises:
      analyzing the TDM assistance information and the GPIO signals to determine the operational status of the first wireless communication circuitry, wherein analyzing the TDM assistance information further comprises:
         determining whether an LTE configuration in the TDM assistance information is frequency-division duplex (FDD) or time-division duplex (TDD);
         in response to determining that the LTE configuration is FDD, setting the operational status of the first wireless communication circuitry to reception; and
         in response to determining that the LTE configuration is TDD, analyzing uplink/downlink (UL/DL) configurations of the TDD to set the operational status of the first wireless communication circuitry to transmission or reception based on the UL/DL configurations;
   in response to determining that the operational status of the first wireless communication circuitry is transmission, restricting the second wireless communication circuitry of the user equipment from receiving data;
   in response to determining that the operational status of the first wireless communication circuitry is reception, restricting the second wireless communication circuitry of the user equipment from transmitting data; and
   transmitting or receiving the data via the second wireless communicating circuitry based on the restrictions.

2. The method of claim 1, wherein the TDM assistance information includes one or more of long-term evolution (LTE) configuration, discontinuous reception (DRX) mode information, and system frame number (SFN).

3. The method of claim 2, wherein analyzing the TDM assistance information comprises:
   determining whether the first wireless communication circuitry has enabled a DRX mode;
   determining whether the first wireless communication circuitry is under a DRX on-duration;
   determining whether the first wireless communication circuitry is under a time-division duplex (TDD) mode; and
   determining whether the first wireless communication circuitry is under a TDD transmitting time slot.

4. The method of claim 1, further comprising:
   enabling, at the second wireless communication circuitry, GPIO_drx monitoring; and determining the operational status of the first wireless communication circuitry based on the monitored GPIO_drx.

5. The method of claim 1, wherein avoiding transmitting data from the second wireless communication circuitry comprises transmitting tasks based on task priority.

6. The method of claim 1, further comprising:
in response to determining that the operational status of the first processor is OFF, arranging the second wireless communication circuitry to transmit and receive data.

7. The method of claim 1, wherein the GPIO signals are real-time data and are received from at least one GPIO pin.

8. The method of claim 1, wherein the first wireless communication circuitry is an LTE modulator-demodulator and wherein the second wireless communication circuitry is a wireless fidelity (WIFI) module, a Bluetooth (BT) module, or a global navigation satellite system (GNSS) module.

9. A system for avoiding in-device coexistence interference on a user equipment, the system comprising:
a first wireless communication circuitry of the user equipment, the first wireless communication circuitry configured to receive and transmit data;
a second wireless communication circuitry of the user equipment, and a general-purpose input/output (GPIO) pin connecting the first wireless communication circuitry and the second wireless communication circuitry, and the second wireless communication circuitry is configured to:
receive, via the GPIO pin at a second wireless communication circuitry of the user equipment, a GPIO signal including time-division multiplexing (TDM) assistance information having information relating to a status of operation and a configuration of wireless communication of the first wireless communication circuitry;
predict an operational status of the first wireless communication circuitry based on the GPIO signal wherein in predicting the operational status of the first wireless communication circuitry, the second wireless communication circuitry is further configured to:
analyze the TDM assistance information and the GPIO signals to determine the operational status of the first wireless communication circuitry, wherein in analyzing of the TDM assistance information the second wireless communication circuitry is further configured to:
determine whether an LTE configuration is frequency-division duplex (FDD) or time-division duplex (TDD);
set the operational status of the first wireless communication circuitry to reception in response to determining that the LTE configuration is FDD; and
analyze uplink/downlink (UL/DL) configurations of the TDD to set the operational status of the first wireless communication circuitry to transmission or reception based on the UL/DL configurations, in response to determining that the LTE configuration is TDD;
restrict receiving data in response to determining that the operational status of the first wireless communication circuitry is transmission;
restrict transmitting data in response to determining that the operational status of the first wireless communication circuitry is reception; and
transmit or receive the data via the second wireless communicating circuitry based on the restrictions.

10. The system of claim 9, wherein the TDM assistance information includes one or more of long-term evolution (LTE) configuration, discontinuous reception (DRX) mode information, and system frame number (SFN).

11. The system of claim 10, wherein the second wireless communication circuitry is further configured to:
determine whether the first wireless communication circuitry has enabled a DRX mode;
determine whether the first wireless communication circuitry is under a DRX on-duration;
determine whether the first wireless communication circuitry is under a time-division duplex (TDD) mode; and
determine whether the first wireless communication circuitry is under a TDD transmitting time slot.

12. The system of claim 9, wherein the second wireless communication circuitry is further configured to:
enable GPIO_drx monitoring; and
determine the operational status of the first wireless communication circuitry based on the monitored GPIO_drx.

13. The system of claim 9, wherein the second wireless communication circuitry is further configured to avoid transmitting data by transmitting tasks based on task priority.

14. The system of claim 9, wherein the second wireless communication circuitry is further configured to transmit and receive data in response to determining that the operational status of the first processor is OFF.

15. The system of claim 9, wherein the GPIO signals are real-time data and are received from at least one GPIO pin.

16. The system of claim 9, wherein the first wireless communication circuitry is an LTE modulator-demodulator and wherein the second wireless communication circuitry is a wireless fidelity (WIFI) module, a Bluetooth (BT) module, or a global navigation satellite system (GNSS) module.

* * * * *